DATA STORAGE REGISTER AND CONTROL SYSTEM

Inventors:
Warren W. Bolander,
B. Paul Chausse,
by Irving H. Marshman
Their Attorney.

DATA STORAGE REGISTER AND CONTROL SYSTEM

Inventors:
Warren W. Bolander,
B. Paul Chausse,
by Irving H. Marshman
Their Attorney.

Fig. 5.
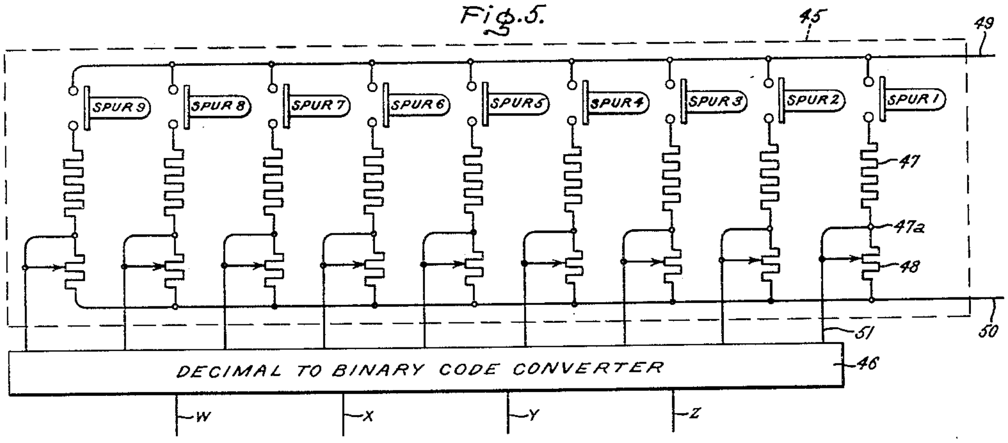
Fig. 6.
| SPUR BUTTONS | INPUTS W | X | Y | Z |
|---|---|---|---|---|
| 1 | | | | O |
| 2 | | | O | |
| 3 | | | O | O |
| 4 | | O | | |
| 5 | | O | | O |
| 6 | | O | O | |
| 7 | | O | O | O |
| 8 | O | | | |
| 9 | O | | | O |
O = PRESENCE OF INPUT VOLTAGE
BLANK = ABSENCE OF INPUT VOLTAGE
Fig. 8.
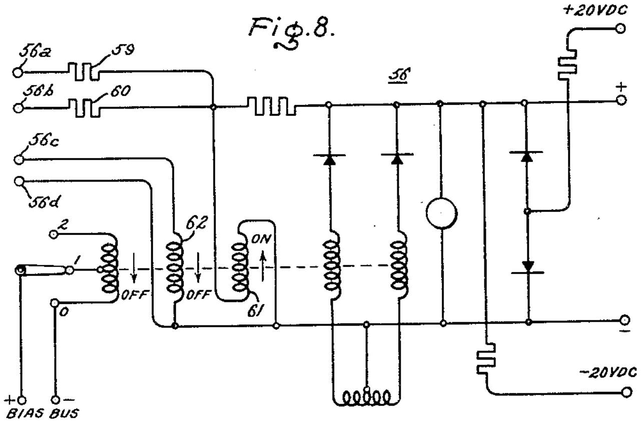
Fig. 9.
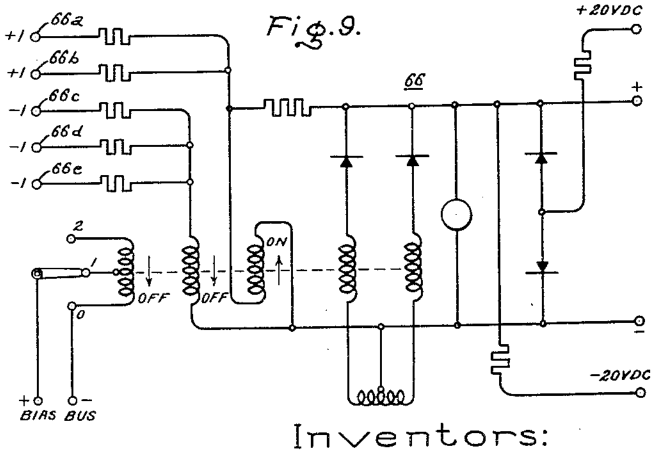
Fig. 7.
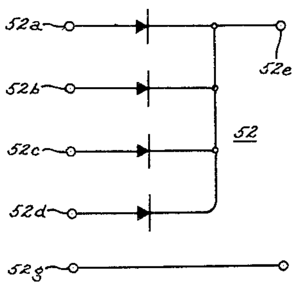
Inventors:
Warren W. Bolander,
B. Paul Chausse,
by Irving H. Marshman
Their Attorney.

DATA STORAGE REGISTER AND CONTROL SYSTEM

Filed Dec. 20, 1956 4 Sheets-Sheet 4

Inventors:
Warren W. Bolander,
B. Paul Chausse,
by Irving H. Marshman
Their Attorney.

United States Patent Office 3,068,451

Patented Dec. 11, 1962

3,068,451

DATA STORAGE REGISTER AND CONTROL SYSTEM

Warren W. Bolander, Scotia, N.Y., and Burnette Paul Chausse, Roanoke, Va., assignors to General Electric Company, a corporation of New York Filed Dec. 20, 1956, Ser. No. 629,558
14 Claims. (Cl. 340—174)

This invention relates to data storage, more particularly to data storage registers, and it has for an object the provision of a simple, reliable and improved device of this character.

More particularly, the invention relates to data storage registers having a plurality of data storage rows arranged in succession, and each comprising a plurality of electrically energizable devices, and a further object of the invention is the provision of an improved means for shifting the data temporarily stored in one row to the next successive row.

A still further object of the invention is the provision of a multi-row data storage register in which each row comprises a plurality of static switching elements, and in which data may be stored in each row in the form of distinct patterns of energization of the switching units therein.

Another and more specific object of the invention is the provision of a data storage register in which magnetic amplifiers are employed as the static switching units in each row.

In carrying the invention into effect in one form thereof, the data storage register comprises a plurality of data storage rows arranged in succession and each comprises a plurality of individual data storage devices. Means are provided for supplying data to the initial row in the succession, and additional means responsive to the presence of data in a first row and to the absence of data from the next successive row are provided for effectitng transfer of data from row to row in succession. In an additional aspect of the invention, a plurality of data readers are provided, each associated with a different one of the data storage rows for responding only to a single, individually distinct pattern of energization of the individual storage devices in its associated row and for effecting transfer of all other data reaching it to the next successive row.

In another aspect of the invention, each of the data readers is utilized to control the operation of a separate control device with which it is operatively associated.

Figure 1:
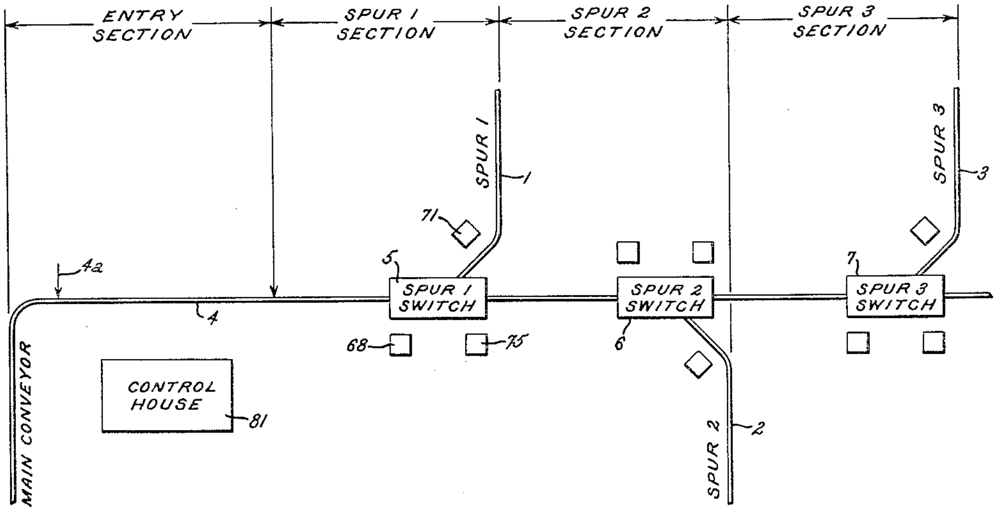
Figure 3:
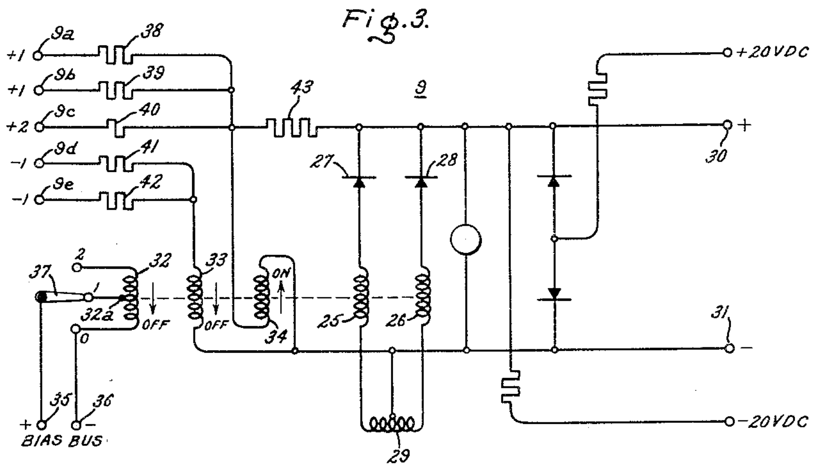
Figure 4:
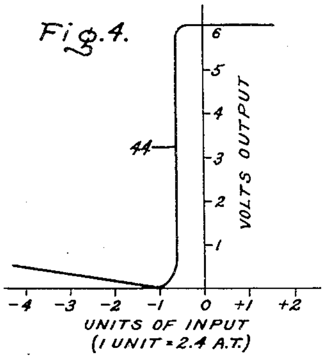
Figure 2:
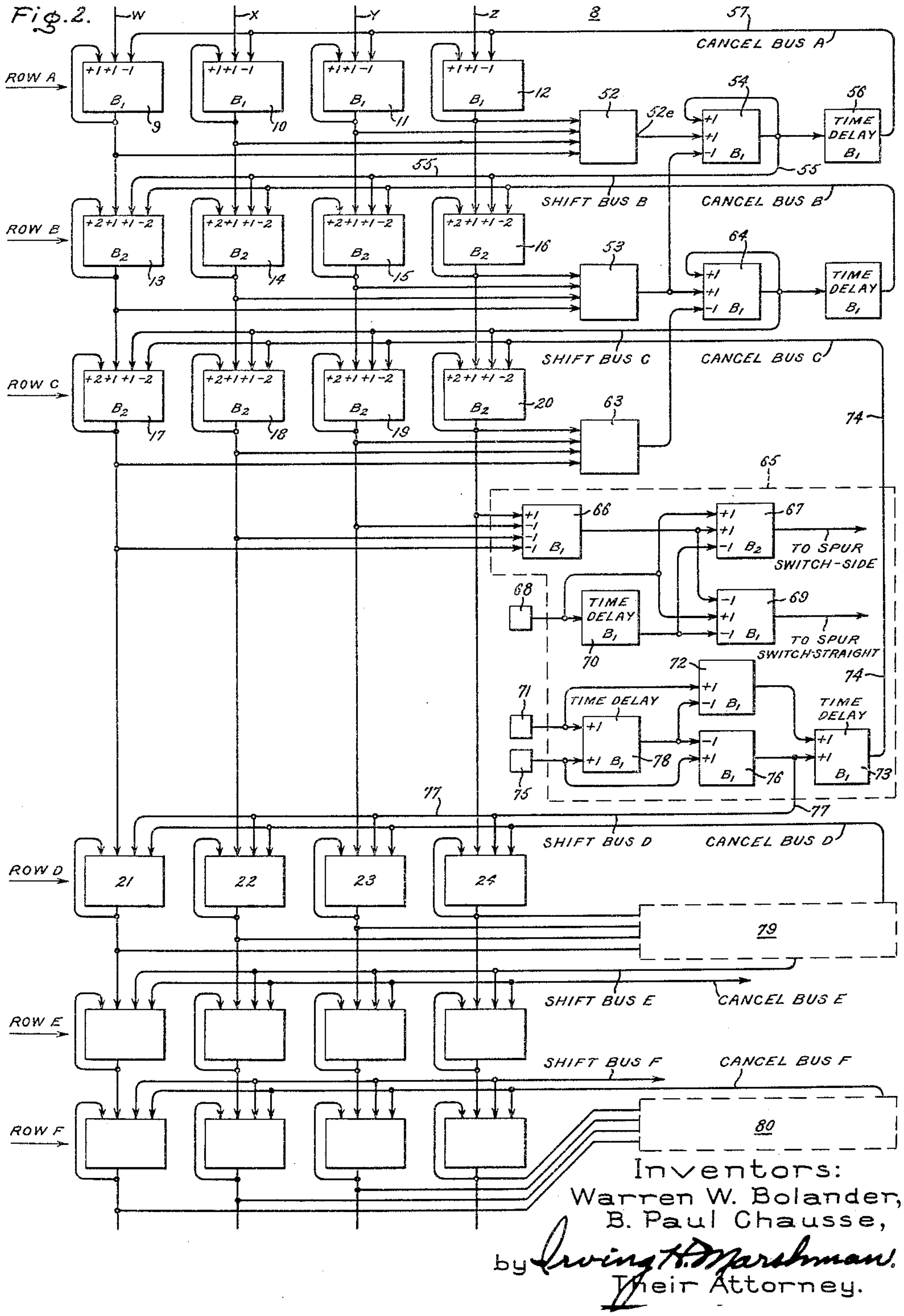
Figure 10:
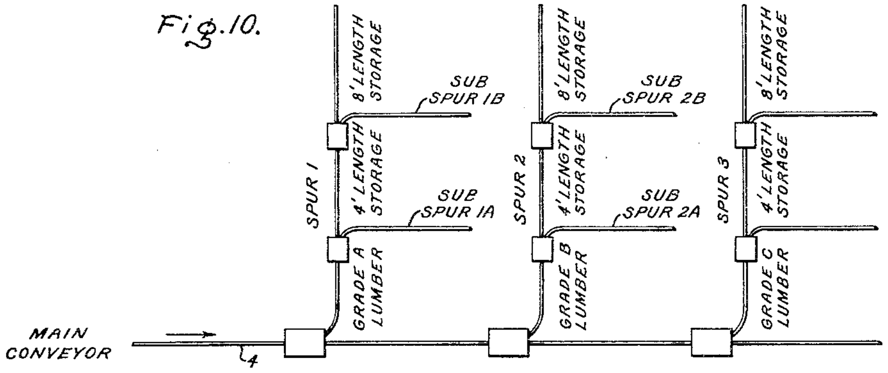
Figure 11:
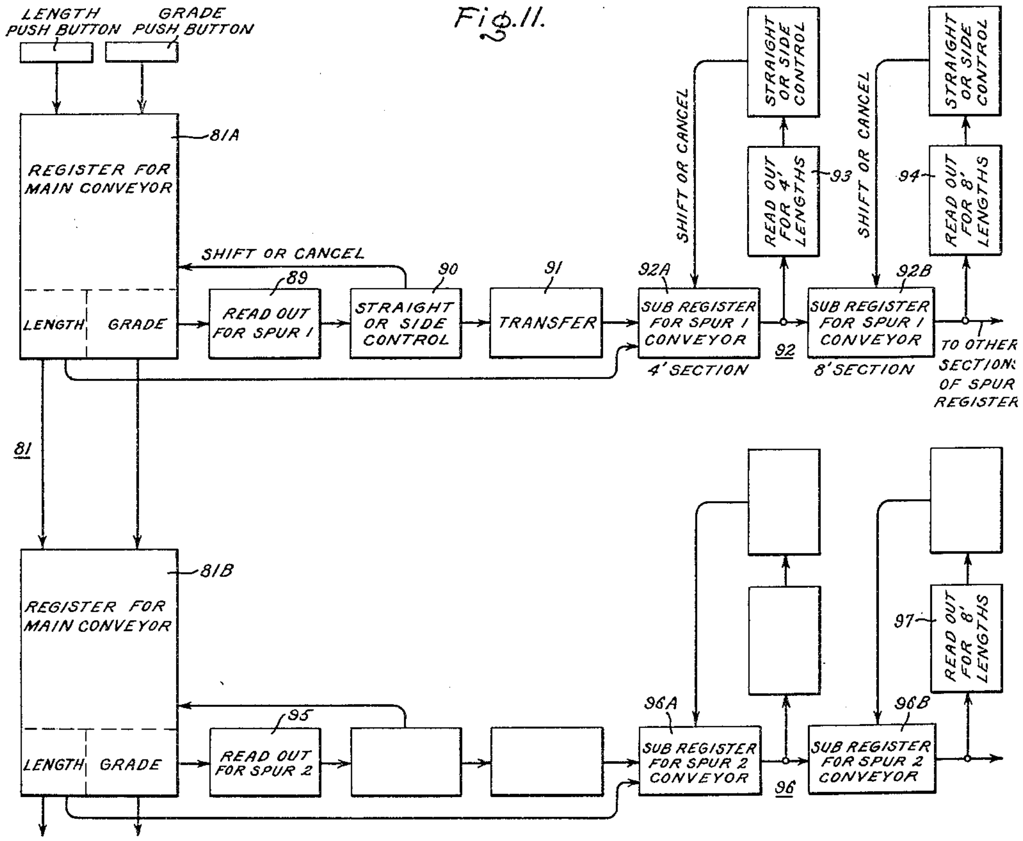
Figure 12:
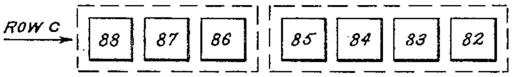

For a better and more complete understanding of the invention, reference should now be had to the following specification and to the accompanying drawings of which FIG. 1 is a simple, diagrammatic sketch of a plural-spur conveyor system in the control of which the data storage register of the invention may usefully be employed; FIG. 2 is a simple block diagram of the data storage register including transfer and readout means; FIG. 3 is a simple, schematic diagram illustrating the circuitry of one of the individual data storage devices, a plurality of which constitute one row of the data storage register; FIG. 4 is a chart of a characteristic curve which facilitates an understanding of the operation of each of the individual data storage devices and static switching components of the register; FIG. 5 is a schematic diagram of an operator's pushbutton switch accessory and decimal-to-binary code converter for supplying digital data in binary code form to the data storage register; FIG. 6 is a table which illustrates the relationship of decimal input and binary code output of the converter; FIG. 7 is a schematic diagram of a detail; FIG. 8 is a schematic diagram of a time delay type static switching element utilized to sequence different steps of the operation, FIG. 9 is a schematic diagram of a static switching element component of the invention, FIGS. 10 and 11 are diagrammatic illustrations of an application of the invention in which the data storage register is utilized as an intermediate storage element capable of initiating sub-routines and processing data to sub-registers, and FIGURE 12 is a diagrammatic illustration of a row of data storage devices.

As one example of a practical application in which the data storage register and the control system of the invention may be utilized, there is illustrated in FIG. 1 a material-handling system for routing finished articles to separate loading platforms for freight cars or trucks having different destinations. It is illustrated as comprising a plurality of spur conveyors 1, 2 and 3 which are supplied from a main conveyor 4. The number of spur conveyors is not limited to three. It is determined by the number of platforms to be served.

Spur track switches 5, 6 and 7 serve to switch finished articles from the main conveyor 4 to the appropriate spur under the control of information or data supplied to and contained in a memory system such as the data storage register 8 which is illustrated in FIG. 2.

The data storage register 8 comprises a matrix of individual data storage devices of which the devices 9 to 20 inclusive in the first section of the register and devices 21 to 24 inclusive in the second section of the register are conventionally illustrated in FIG. 2. It is illustrated as having four such data storage devices in each row. The number of rows is determined by the maximum possible number of articles at one time on the portion of the main conveyor which is associated with the spur conveyors. In general, each row of the register is a repetition of the preceding row. Consequently, in the interest of simplification of the drawing, there is illustrated in FIG. 2 only that portion of the register which corresponds to the portion of the main conveyor which is associated with spurs 1, 2 and 3. It is possible to have three articles on the section of the main conveyor preceding spur 1, one article on the section between spur 1 and spur 2 and two articles on the section between spur 2 and spur 3; hence six rows of the data storage register are illustrated.

Each of the data storage devices is a static switching element of the type generally known in the art as a self-saturating magnetic amplifier. Such devices are also known as amplistats. The magnetic amplifiers 9, 10, 11 and 12 in row A are identical, and the details of the amplifier 9 are illustrated in FIG. 3 of drawing. As shown in FIG. 3, the magnetic amplifier 9 comprises a pair of load circuit reactor windings 25 and 26 wound upon a magnetic core structure (not shown) and connected with rectifiers 27 and 28 in a biphase diametric rectifying circuit which is supplied from a suitable source of alternating voltage such for example as the center-tapped secondary winding 29 of a supply transformer. The two rectifiers are connected together to a common terminal 30 which thus becomes the positive output terminal and the centertap of the transformer secondary is connected to a common conductor 31 which thus becomes the negative output terminal. For the purpose of controlling the saturation of the core, the magnetic amplifier is further provided with three control coils 32, 33 and 34 which serve as negative bias coil, turn-off control coil and turn-on control coil respectively.

To the bias coil 32 constant direct current of suitable magnitude is supplied from a suitable source such as represented by supply terminals 35 and 36. In addition to its end terminals the bias coil is provided with a centertap *32a* which together with selector switch 37 makes it possible to connect either the entire coil, one half of it, or none of it to the source.

The amplifier is provided with a plurality of input terminals 9*a*, 9*b* and 9*c* which are connected through resistors 38, 39 and 40 respectively to the turn-on coil 34 and is further provided with input terminals 9*d* and 9*e* which are connected through resistors 41 and 42 respectively to the turn-off coil 33. In a typical static switching unit such as the unit 9, the resistors 38, 39, 41 and 42 may have resistances of 750 ohms and the resistor 40 may have a resistance of somewhat less than one half that amount in order that with the same voltage applied to all input terminals, two units of input will be provided by the input to terminal 9*c* for one unit produced by the input to each of the other terminals. Positive feedback is provided by means of a connection between the positive output terminal 30 and the turn-on coil. Included in this connection is a resistor 43 having a suitable resistance which in a representative case may be 2700 ohms. If feedback is not required, this latter connection may be omitted.

In FIG. 4 of the drawing the input versus output characteristic of the amplifier 9 is represented by the curve 44 of which ordinates represent volts output, and abscissae represent units of input. For convenience, one unit of input may be assumed to be 2.4 ampere turns. With the switch 37 in its central position, only one-half of the negative bias coil 32 is energized. The magnitude of the constant current source 35, 36 is selected to produce one unit of negative bias energization when one-half the coil is energized. As shown by curve 44, at one unit negative bias the amplifier has zero voltage output. One unit of positive input supplied to the turn-on coil will counteract the one-unit negative bias and turn the amplifier full on. In other words the amplifier will have maximum output which in a typical amplifier may be assumed to be 6 volts. Thus the curve 44 shows the amplifier to be a bi-stable on-off switching device.

The selector switches for the four amplifiers 9, 10, 11 and 12 in row A of the register are all set in their central positions to provide one unit of negative bias whereas the selector switches for the amplifiers in the succeeding rows are all set to provide two units of negative bias. In FIG. 2 of the drawing the amount of negative bias for each magnetic amplifier shown therein is indicated at the bottom of the conventional block representation of such amplifier by the letter B followed by a number indicating the number of units of such negative bias.

Data is supplied to initial row A of the data storage register 8 through four separate input channels W, X, Y and Z, one for each of the amplifiers in the row. See FIG. 5. For the purpose of suppling such data to the four input channels, a spur selector 45 and a decimal-to-binary code converter 46 are provided. Preferably the spur selector is a pushbutton station accessory and comprises a plurality of pushbutton switches each corresponding to a different spur as indicated by appropriate spur number designations. Although the conveyor in FIG. 1 is illustrated as having but three spur tracks, the spur selector 45 is illustrated as having nine pushbutton switches and therefore capable of application to a conveyor system having a maximum of nine or any lesser number of spur tracks.

The spur 1 pushbutton switch is connected in series with a voltage divider which is illustrated as comprising two resistors 47 and 48 across a source of direct voltage supply such as represented by supply conductors 49 and 50. The intermediate terminal 47*a* of the voltage divider is connected to the input of the binary code converter by means of a conductor 51. Appropriately, the voltage of the source may be 110 volts, and the resistors 47 and 48 may have resistances of 1,000 and 60 ohms respectively so that an input voltage of approximately 6 volts is applied to the binary code converter in response to closing of spur 1 pushbutton switch. The remaining pushbutton switches are connected in series with similar voltage dividers across supply conductors 49 and 50, and connections from intermediate points of such voltage dividers to the input of the binary code converter are provided.

Responsively to voltages supplied to its input from the spur selector 45, the binary code converter produces and supplies output voltages to the four input channels W, X, Y and Z of the data storage register in accordance with the table of FIG. 6 in which the symbol 0 in a square represents the presence of an input voltage and a blank indicates the absence of an input voltage. With spur 1 button depressed, an input voltage is supplied to input channel Z; with spur 2 button depressed, an input voltage is supplied to channel Y, and with spur 3 button depressed, input voltages are supplied to channels Y and Z. Thus the closing of each pushbutton switch results in an individually distinct pattern of energization of the input channels W, X, Y and Z.

The magnitudes of the voltages supplied from the binary code converter to the input channels are chosen so that the input to each row A amplifier 9, 10, 11 or 12 of the data storage register completely counteracts its one unit of negative bias and energizes the amplifier, i.e. turns it on to cause it to produce an output voltage. In other words, the converter furnishes +1 inputs to the row A amplifier. As shown in FIG. 2, these amplifiers in row A have +1 feedbacks, and consequently each remains energized after release of the pushbutton switch the closing of which produced its energization. Thus the closing of pushbutton switches in the spur selector supplies to row A of the data storage register coded data in the form of individually distinct patterns of energization of the amplifiers constituting such row.

If no data is stored in row B, the data stored in row A is transferred to row B in order to reset row A for receiving further coded data from the binary converter in response to the next closing of a pushbutton switch in the spur selector. For the purpose of determining whether data is present in rows A and B, the register is provided with suitable detecting units 52 and 53, and for the purpose of effecting transfer of data from row A to row B, if none is present in row B, a suitable discriminating means 54 is provided. The detector units 52 and 53 are of the type which are used in logic systems and which are known as OR units. An OR unit is a device which has an output if an input exists on any one or more of a plurality of input terminals. As shown in FIG. 7, OR detector unit 52 comprises a plurality of rectifiers connected in parallel with each other between a plurality of input terminals 52*a*, 52*b*, 52*c* and 52*d* an output terminal 52*e* and a common input-output terminal 52*g*. If an input voltage exists at any one or more of the input terminals, a voltage is also present at the output terminal 52*e*, and if no voltage exists at any input terminal the unit has zero output. The detector unit 53 is identical with unit 52. Each of the input terminals of OR unit 52 is connected to the output of a different one of the row A amplifiers, and similarly each of the input terminals of OR unit 53 is connected to the output of a different one of the row B amplifiers.

Preferably, the discriminator unit 54 is an amplistat type magnetic amplifier which is identical with amplifier in row A and illustrated in detail in FIG. 3. The output terminal 52*e* of OR unit 52 is connected to a turn-on input terminal of amplifier 54 and thus when unit 52 has an output, a +1 unit of input energization is supplied to amplifier 54. On the other hand, the output terminal of OR unit 53 is connected to a turn-off coil input terminal of discriminator 54. Consequently if OR unit 53 has an output voltage −1 unit of input is supplied to the discriminator which adds to the one unit negative bias and prevents energization of the discriminator by the +1 input from OR unit 52. As indicated in FIG. 2, the discriminator 54 has +1 unit positive feedback. Its output is connected to a shaft bus 55 for the row B amplifiers and is also connected through a time delay device 56 to a cancel bus 57 for the row A amplifiers. When the discriminator has an output, the shift bus 55 supplies +1 input to each of the row B amplifiers 13, 14, 15 and 16. A brief interval of time after the energization of shift bus 55, as determined by time delay device 56, the cancel bus 57 supplies −1 input to the row A amplifiers.

Although the time delay device 56 may be of any suitable type, it is preferably of the magnetic amplifier type with time delay between the supply of voltage to its input and the appearance of voltage at its output such for example as the magnetic amplifier disclosed in FIG. 8. This amplifier is generally similar to the amplifier 9 disclosed in FIG. 3 but differs therefrom in the arrangement of its input connections. As shown, it has two input terminals 56*a* and 56*b* which are connected through separate resistors 59 and 60 respectively to the turn-on coil 61. Its turn-off coil 62 is connected to terminals 56*c* and 56*d*. With these turn-off coil terminals short-circuited, maximum time delay between input and output is effected. Such time delay might be of the order of .5 second. A shorter time delay may be obtained by connecting a resistor across terminals 56*c* and 56*d*. For example a 50 ohm resistor connected across these terminals would appreciably shorten the time delay, e.g. to .1 second.

Briefly the operation to transfer data from row A to row B is as follows: If coded data is stored in rows A and B, the individual amplifiers in which such data is stored will be energized and will have outputs. Assume for example that amplifiers 11 and 12 in row A and amplifier 16 in row B are energized and have outputs. Amplifier 11 supplies +1 injut to amplifier 15, but this is insufficient to counteract the 2-unit negative bias. Consequently, amplifier 15 remains deenergized. Similarly, amplifier 12 supplies +1 input to amplifier 16, but this has no effect because amplifier 16 was assumed energized. Voltage is supplied from the output of amplifier 16 to OR unit 53 which supplies −1 unit input to discriminator 54 thereby adding −1 unit to the existing negative bias of one unit. Similarly voltages are supplied from the output of amplifiers 11 and 12 in row A to OR unit 52 which supplies +1 unit input to the discriminator. This is insufficient to counteract the −2 units resulting from the negative bias and the −1 input supplied by OR unit 53. Consequently the discriminator 54 remains deenergized and supplies zero voltage to the shift bus 55. This prevents transfer of any data from row A to row B since the energization of the shift bus is necessary to counteract the 2-unit negative biases of the row B amplifiers in order to effect such transfer.

If no data is stored in row B, i.e. if no row B amplifiers are energized, the outputs of the energized row A amplifiers supply +1 inputs to the corresponding row B amplifiers. Consequently the amplifiers 11 and 12 which were assumed to be energized, supply +1 input to corresponding amplifiers 15 and 16 in row B. This is insufficient to counteract the two-unit negative biases of amplifiers 15 and 16 which therefore continue deenergized. Since no amplifier in row B is energized OR unit 53 supplies zero input to discriminator 54. Consequently the +1 input supplied by OR unit 52 counteracts the one unit negative bias of the discriminator to cause it to have an output voltage and seal itself in through its positive feedback of +1 unit. The output voltage of the discriminator energizes the shift bus 55 to supply +1 unit of energization to all B row amplifiers. This is insufficient to counteract the two-unit negative biases of amplifiers 13 and 14 which receive no input from the deenergized corresponding amplifiers of row A. However the sum of the +1 input supplied from the shift bus and the +1 input supplied to each of the amplifiers 15 and 16 from the corresponding energized amplifiers 11 and 12 counteracts the two-unit negative bias of amplifiers 15 and 16. As a result, amplifiers 15 and 16 are energized and seal themselves in through their two-unit positive feedbacks. A brief interval of time following the energization of the discriminator, e.g. .1 second, time delay amplifier 56 energizes cancel bus 57 which furnishes −1 unit inputs to all row A amplifiers thereby to counteract the feedback of amplifiers 11 and 12 and effect their deenergization. This completes the transfer of data from row A to row B.

As a result of the deenergization of amplifiers 11 and 12, OR unit 52 supplies zero input to discriminator 54, and in response to energization of amplifiers 15 and 16, OR unit 53 supplies −1 input to discriminator 54 which together with the −1 unit negative bias turns off the discriminator to leave it in a reset condition. Time delay amplifier 56 is turned off by its 1 unit negative bias in response to the disappearance of output voltage of discriminator 54 from OR unit 53 prevents the discriminator from operating to transfer to row B any new data received in row A as long as data is present in row B.

In a similar manner OR units 53 and 63 cooperate with discriminator 64 to effect transfer of data from row B to row C. Thus, coded data supplied to row A from the binary converter is continually advanced from row to row to fill the higher lettered rows of the data storage register.

At a prior point in this specification it was assumed that only three articles may simultaneously occupy the initial section of the main conveyor between the entrance points 4*a* and spur 1. Consequently the corresponding initial section of the data storage register will have three rows A, B and C of data storage devices, one for each article on such initial section. For the purpose of operating the spur 1 track switch for articles destined for spur 1, a readout 65 is provided on the output side of row C. It comprises a magnetic amplifier 66 which, as illustrated in detail in FIG. 9, is generally similar to the magnetic amplifier 9 of FIG. 3 but differs therefrom in the pattern of connection of its input terminals to its turn-on and turn-off coils. As shown in the table at FIG. 6 in the binary system of coding, only the Z channel amplifier 20 in row C is energized to effect operation of spur switch 1. Consequently, amplifier 66 in the readout has one terminal 66*a* which is connected to the output of amplifier 20 and to its own turn-on coil for furnishing +1 input thereto. However, since all data destined for row D and beyond must pass through row C and may involve energization of amplifier 20 in combination with energization of one or more of amplifiers 17, 18 and 19, amplifier 66 is provided with three additional input terminals 66*c*, 66*d* and 66*e* which are individually connected to the outputs of amplifiers 17, 18 and 19 respectively in row C and to its own turn-off coil for furnishing −1 input thereto for each of amplifiers 17, 18 and 19 which may be energized. Thus the readout amplifier 66 may be energized only in response to a single, individually distinct pattern of energization of the amplifiers in row C, i.e. solely in response to energization of amplifier 20. If any other amplifier in row C is energized, it supplies −1 input to the readout amplifier to counteract the +1 input from amplifier 20.

The output of amplifier 66 is connected to a turn-on coil input terminal of a magnetic amplifier 67 which is identical with the amplifiers in the data storage rows of the register. Its negative bias selector switch is operated to the 2-unit position. Connected to another turn-on coil of the amplifier is the output of a photoelectric relay 68 which is positioned at the entrance of the spur 1 zone of the main conveyor 4 so as to have its beam interrupted by each article on the conveyor as it enters such zone. The photoelectric relay 68 is illustrated conventionally. It may be of any suitable type such for example as the photoelectric relay disclosed in U.S. Patent 1,964,454, Cockrell et al. The output of amplifier 67 is connected to a suitable control device such as an electromagnetically operated switch (not shown) and an electric motor (not shown) controlled thereby for operating the spur 1 track switch to the position for diverting an article from the main conveyor to the spur.

For the purpose of operating the spur 1 track switch to the "straight" position for those articles on the main conveyor destined for spurs beyond spur 1, a magnetic amplifier 69 and a switching device (not shown) controlled thereby are provided for energizing the motor to operate the track switch to the "straight" position. One turn-on coil input terminal of amplifier 69 is connected to the output of the zone entry photoelectric relay 68 to receive +1 input in response to interruption of the light beam by such articles at the zone entrance. The turn-off coil of amplifier 69 is connected to the output of data responsive amplifier 66 to provide −1 input to amplifier 69 to prevent its energization and operation of the electromagnetic switch controlled thereby whenever the data responsive amplifier is energized to effect operation of the spur track switch to divert articles from the conveyor to the spur. In order to reset amplifiers 67 and 69 after operation of the electromagnetic switches controlled thereby, a time delay type magnetic amplifier 70 is provided for supplying −1 input to their turn-off coils which, combined with their negative biases, effects their deenergization a predetermined interval of time after interruption of the light beam of photoelectric relay 68. Preferably amplifier 70 is of the same type as time delay relay 56 which is illustrated in FIG. 8. The energization and deenergization of either amplifier 67 or 69 provides a pulse which in effect "tells" the electrical control and actuating means to operate the spur track switch to the side or straight position as the case may be. Time delay amplifier 70 could be replaced by a memory unit such as amplifier 9 which would retain the track switch operation signal until the track switch completed its movement as determined by limit switches or other suitable means.

In order to initiate cancellation of the data in row C after an article has been diverted from the conveyor to spur 1, a photoelectric relay 71, which is similar to photoelectric relay 68, is mounted on the spur so that its beam is interrupted by an article entering the spur. Interruption of the beam causes the photoelectric relay to supply +1 input to the magnetic amplifier 72 which is similar to the amplifiers in the data storage rows of the register. The output of amplifier 72 is connected through a time delay amplifier 73 to the cancel bus 74 for amplifiers 17, 18, 19 and 20 in row C.

For the purpose of shifting data from row C to row D for those articles on the conveyor which are destined for spurs beyond spur 1, a photoelectric relay 75 is mounted in relation to the main conveyor so as to have its beam interrupted by an article on the main conveyor at a point beyond the entrance of spur 1. Photoelectric relay 75, which is shown conventionally, is preferably similar to photoelectric relays 68 and 71. When its beam is interrupted, it supplies +1 input to a magnetic amplifier 76 the output of which is connected to row D shift bus 77 and also through time delay amplifier 73 to the row C cancel bus 74. To provide for resetting the shift bus and cancel bus control amplifiers 76 and 72, a time delay amplifier 78, which is similar to time delay magnetic amplifier 56, is provided. It has one turn-on input terminal connected to receive +1 input from photoelectric relay 71 in response to interruption of its beam and another turn-on coil terminal connected to receive +1 input from photoelectric relay 75 in response to interruption of its beam. Its output is connected to supply −1 input to the amplifier 76 and also to supply −1 input to the amplifier 72 so as to deenergize each of the buses a predetermined interval of time, e.g. .2 second after the energization of each.

The data storage register has the same number of readouts as the number of spur tracks, and each is similar to readout 65. Thus readouts 79 and 80, which are conventionally illustrated in block form, are provided for controlling the spur switches for spurs 2 and 3. Like the data responsive amplifier 66 in readout 65, the data responsive amplifiers in the readouts 79 and 80 have their turn-on coils connected to the outputs of the amplifiers in the data storage rows to whose energization they are required to respond, and their turn-off coils connected to all other amplifiers in the same row. Their negative biases will be adjusted to value such that in combination with the −1 input supplied from such other amplifiers, the data responsive amplifier remains deenergized. Thus each readout is responsive to individually distinct patterns of energization of the amplifiers in its corresponding row.

Located adjacent the entry zone of the main conveyor 4 is a control house 81 in which the operator is stationed. In this control house are located the operator's spur selector pushbutton station 45, the decimal-to-binary code converter 46 and the data storage register 8.

With the foregoing understanding of the elements and their organization, the operation of the data storage register of the invention in the control of the conveyor spurs will readily be understood from the following detailed description.

As an initial operating condition, it is assumed that an article on the entry section of the main conveyor is approaching the control house and that no articles are on any of the sections beyond the entry section. Consequently no data is stored in the data storage register, i.e. all amplifiers in the data storage rows are deenergized. As the article on entry section comes into view, the operator determines from its character the loading platform to which it should be delivered and depresses the pushbutton for the spur which serves such platform. For example if he determines that the article should be delivered to the platform served by spur 1, he depresses the spur 1 pushbutton. This causes a voltage to be supplied to the input conductor 51 of the decimal-to-binary code converter 46 (FIG. 5), and the converter in turn supplies a voltage to channel Z which energizes amplifier 12 in row A of the data storage register. Amplifier 12 seals itself in through its feedback and thus remains energized after the operator releases the spur 1 pushbutton. It supplies +1 input to corresponding amplifier 16 in row B, but this is insufficient to overcome the latter's two-unit negative bias, and accordingly amplifier 16 remains temporarily deenergized and has zero output. OR unit 52 is energized from the output of amplifier 12 and supplies +1 input to the discriminator 54. There being no data stored in row B, i.e. no amplifier in row B being energized, OR unit 53 is not energized and therefore does not supply negative input to the discriminator 54. Consequently the positive input supplied by OR unit 52 counteracts the one unit negative bias of the discriminator thereby causing it to have an output which energizes the shift bus 55 for row B to complete energization of amplifier 16. After a short time, which is determined by the time delay device 56, the cancel bus 57 for row A is energized to effect deenergization of amplifier 12 thereby completing the transfer of data from row A to row B. In a similar manner, amplifier 20 in row C is energized, and amplifier 16 in row B is deenergized to complete transfer of the data from row B to row C. This data remains stored in row C until the article on the conveyor, whose spur destination it determines, interrupts the beam of photoelectric relay 68 at the spur 1 entrance zone.

If the next article passing the control house is destined for the platform served by spur 3, the operator depresses the spur 3 pushbutton. As indicated in the table of FIG. 6, a different pattern of energization of the amplifiers in row A results; in this case amplifiers 11 and 12 are both energized and this pattern of energization is transferred to row B. Its transfer to row C is temporarily prevented by the presence of data in row C as a result of which OR unit 63 supplies −1 input to discriminator 64 to augment its one unit negative bias and prevent its energization by its +1 input supplied by OR unit 53.

If the next article in the entry section is destined for spur 2, the operator depresses the spur 2 pushbutton. As shown in the table of FIG. 6, the binary converter, in response to actuation of the spur 2 pushbutton, will energize channel Y which in turn will energize amplifier 11 in row A. The energization of amplifier 11 causes OR unit 52 to supply +1 input to discriminator 54. However, owing to the presence of data in row B, discriminator 54 is temporarily prevented from transferring the data from row A to row B.

The energization of amplifier 20 in row C results in energization of data responsive amplifier 66 in readout 65, and amplifier 66 in turn supplies +1 input to amplifier 67 which +1 input however is insufficient to counteract its two-unit negative bias. Simultaneously, amplifier 66 supplies −1 input to amplifier 69 to augment its one-unit negative bias.

As the article whose destination is determined by the data in row C reaches the entrance zone for spur 1 it interrupts the light beam of photoelectric relay 68 thereby to cause it to supply +1 input to amplifier 67 which together with the +1 input supplied by amplifier 66 counteracts the two-unit negative bias of the amplifier 67. In response, amplifier 67 effects energization of spur 1 switch to divert the article from the main conveyor to spur 1. Simultaneously, photoelectric relay 68 supplies +1 unit input to amplifier 69, but this is insufficient to counteract the combination of its one-unit negative bias and the −1 input from amplifier 66. Consequently amplifier 69 remains deenergized. As the article enters the spur 1 conveyor, it interrupts the beam of photoelectric relay 71 to furnish +1 input to the cancel amplifier 72 which in turn energizes time delay amplifier 73. After a brief interval of time, e.g. .1 second, amplifier 73 energizes cancel bus 74 to effect cancellation of the data in row C of the register. After a further brief interval of time, time delay amplifier 58, which is also supplied from photoelectric relay 71, supplies −1 input to the cancel amplifier 72 thereby to deenergize it and the row C cancel bus 74.

Immediately following the cancellation of data in row C, the data in row B is transferred to row C, and the data in row A is transferred to row B in the previously described manner. Since both amplifiers 19 and 20 in row C are now energized, amplifier 66 in the spur 1 readout 65 will not respond because amplifier 19 supplies −1 input and amplifier 20 supplies +1 input to amplifier 66. These inputs cancel each other. Consequently when the article whose destination is controlled by the data now present in row C interrupts the beam of zone entry photoelectric relay 68, the spur switch is not operated and amplifier 66 does not furnish −1 input to amplifier 69. However, photoelectric relay 68 supplies +1 input to amplifier 69 which responds to effect operation of the "straight" conveyor switch to cause the article to continue on the main conveyor. After a brief time interval, e.g. .3 second, time delay amplifier 70 which is energized by photoelectric relay 68 supplies −1 input to deenergize the "straight" switch amplifier 69.

As the article continues along the main conveyor, it interrupts the beam of photoelectric relay 75. This results in energizing amplifier 76 which in turn energizes the shift bus 77 thereby to effect energization of the amplifiers 23 and 24 in row D of the register. Amplifier 76 also energizes time delay amplifier 73 which after a predetermined time interval, e.g. .1 second, energizes the cancel bus for row C to complete the transfer of data from row C to row D. The readout 79 associated with row D does not respond to the pattern of energization in which amplifiers 23 and 24 are energized, and consequently the data in row D is transferred to rows E and F in the manner previously described for transfer of data from one row to the next. However, the readout 80 at row F does respond to this pattern to energize the spur 3 switch to divert the article from the main conveyor to spur 3.

Likewise the data for the third article for which spur 2 pushbutton was depressed is shifted from row to row until it reaches row D, and readout 79 responds to actuate the spur 2 switch to divert the article from the main conveyor spur 2.

In addition to its use as a final output element, the data storage register may be utilized as an intermediate storage element capable of initiating sub-routines or processing information to sub-registers. One example of this would be a lumber-sorting application such as illustrated diagrammatically in FIG. 10 in which lumber proceeding on the main conveyor 4 is diverted to spur conveyors 1, 2 and 3 as a function of grade. For example, grade A lumber may be destined for spur 1, grade B lumber for spur 2 and grade C lumber for spur 3. Lumber proceeding on each spur conveyor is, in turn, to be diverted to sub-spur conveyors as a function of length.

To accomplish this, a main data storage register 81, similar to the data storage register 8 of FIG. 2, is provided. It is illustrated as comprising a plurality of sections 81A, 81B etc. Section 81A corresponds to the section of conveyor 8 which comprises rows A, B and C, and section 81B corresponds to the section which comprises row D.

In order to process grade information and length information simultaneously, each row of the register has a plurality of individual data storage devices for storing grade information and additional individual data storage devices for storing length information. A typical row of the register is illustrated in FIG. 12 in which binary coded spur destination information for the different grades of lumber is temporarily stored in individual data storage devices 82, 83, 84 and 85, and binary coded sub-spur destination information for the different lengths is stored in individual storage devices 86, 87 and 88. This row may correspond to row C of the register illustrated in FIG 2.

Assume that a bundle of grade A lumber of 8 foot length approaches the control house station on the main conveyor. The operator will depress the grade A (spur 1) pushbutton and the 8 foot length pushbutton. As a result, data will be supplied to the main register and will be shifted from the initial row, to row C in the manner previously described with respect to FIG. 2. In row C individual storage devices 82 and 87 are energized, and the readout 89 responds only to the spur information (i.e. energization of device 82) and energizes the control unit 90 to operate the spur 1 switch to divert the lumber to spur conveyor 1. A transfer unit 91 shifts the length data, i.e. energization of individual storage device 86 from row C to the first row of section 92A of a sub-register 92. In this sub-register the data is transferred frow row to row in the manner previously described for the main register. The readout 93 for sub-spur 1A (for four foot length) does not respond to the coded data in section 92A, and consequently the data is transferred to the next section 92B in the manner previously described, and then transferred from row to row until it reaches the readout 94. This readout responds and effects operation of a track switch to divert the lumber from spur 1 to sub-spur 1B for the 8 foot length lumber.

For a bundle of grade B lumber of 8 foot length, the operator depresses pushbuttons corresponding to grade and length which after the data is shifted from row to row, results in energization of individual storage devices 83 and 87 in row C of the main register. Readout 89 does not respond, and consequently this data, both for grade and length, is shifted to the next section 81B. Readout 95 responds and causes the track switch for spur 2 to be operated to the "side" position to divert the lumber to spur 2. The length data is then shifted through the rows of sections 96A and 96B of sub-register 96 until it reaches readout 97 which responds and operates the spur switch to divert the lumber from spur 2 to sub-spur 2B.

Although in accordance with the provisions of the patent statutes, this invention is described as embodied in concrete form, and the principle thereof has been described together with the best mode in which it is now contemplated applying that principle, it will be understood that the apparatus shown and described is merely illustrative, and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A data storage register having a plurality of data storage rows arranged in succession and each comprising a plurality of data storage devices, means for supplying data to the initial row in said succession, means responsive to the presence of stored data in a first of said rows and to the absence of stored data from the next successive row for transferring said stored data from said first row to said next successive row.

2. A data storage register having a plurality of data storage rows arranged in succession and each comprising a plurality of electrically energizable data storage devices each having an input and an output, means for supplying to the initial row in said succession data to be stored in the form of energization of certain of said devices in said initial row, connections from the outputs of said devices in each preceding row to the inputs of the corresponding devices in the next successive row, and discriminator means responsive jointly to output of a device in a first of said rows and to the absence of output of all said devices in the next successive row for transferring the data from said first row to said next successive row.

3. A data storage register having a plurality of data storage rows arranged in succession and each comprising a plurality of electrically energizable devices each having an input and an output, means for supplying to the initial row in said succession data to be stored in the form of energization of certain of said devices in said initial row, connections from the outputs of said devices in each preceding row to the inputs of the corresponding devices in the next successive row for partially energizing said devices in said next successive row corresponding to the devices energized in said preceding row and discriminator means responsive jointly to output of a device in a first of said rows and to the absence of output of all of said devices in the next successive row for supplying to the inputs of all devices in said next successive row equal amounts of energization sufficient only to complete the energization of said partially energized devices and for deenergizing the energized devices in said first row thereby to effect transfer of the data stored in said first row to said next successive row.

4. A data storage register having a plurality of data storage rows arranged in succession and each comprising a plurality of electrically energizable devices each having an input and an output, means for supplying to the initial row in said succession data to be stored in the form of energization of certain of said devices in said initial row, connections from the outputs of said devices in each preceding row to the inputs of the corresponding devices in the next successive row for partially energizing said devices in said next successive row corresponding to the devices energized in said preceding row and discriminator means responsive jointly to output of a device in a first of said rows and to the absence of output of all said devices in the next successive row for supplying to the inputs of all devices in said next successive row equal amounts of energization sufficient only to complete the energization of said partially energized devices, and time delay means for delaying the deenergization of the devices in said first row for a predetermined interval of time after completion of the energization of said devices in said second row.

5. A data storage register having a plurality of data storage rows arranged in succession, means for supplying data to the initial row in said succession, discriminator means responsive to the presence of data in a first of said rows and to the absence of data from the next successive row for effecting the transfer of data from said first row to said next row and a plurality of data readers each operatively associated with a different one of said rows and each selectively responsive only to predetermined data in its associated row.

6. A data storage register having a plurality of data storage rows arranged in succession and each comprising a plurality of electrically energizable devices, means for supplying data to the initial row in said succession to be stored in the form of different patterns of energization of said devices, an OR unit responsive to the presence of data in a first of said rows for producing a data-present signal, a second OR unit responsive to the presence of data in the next successive row for producing a data-present signal, and discriminator means responsive to a data-present signal from said first OR unit and to the absence of a data-present signal from said second OR unit for effecting transfer of data in said first row to said next location and responsive to a data-present signal from said second OR unit for preventing said transfer.

7. A data storage register having a plurality of data storage rows arranged in succession and each comprising a plurality of electrically energizable devices each having an input and an output, means for supplying to the initial row in said succession data to be stored in the form of patterns of energization of said devices in said initial row, direct conductor connections from the outputs of said devices in each preceding row to the inputs of the corresponding devices in the next successive row for partially energizing said devices in said next successive row corresponding to the devices energized in said preceding row, discriminator means responsive to the presence of data in a first of said rows and to the absence of data in the next successive row for supplying to the inputs of all devices in said next successive row equal amounts of energization sufficient only to complete the energization of said partially energized devices and for deenergizing the energized devices in said first row thereby to effect transfer of the data stored in said first row to said next successive row.

8. A data storage register having a plurality of data storage rows arranged in succession and each comprising a plurality of self-saturating magnetic amplifiers each having an output, an input and means providing a negative bias, means for supplying to the initial row in said succession data to be stored in the form of patterns of energization of said amplifiers in said initial row, connections from the outputs of said amplifiers in each preceding row to the inputs of the corresponding amplifiers in the next successive row for partially counteracting the biases of the amplifiers in said next successive row corresponding to the amplifiers energized in said preceding row, discriminator means responsive to the existence of output voltages of one or more amplifiers in a first of said rows and to the absence of output voltage of all the amplifiers in the next successive row for supplying to the inputs of all amplifiers in said next successive row substantially equal amounts of energization sufficient to complete the counteraction of said partially counteracted biases and insufficient to complete the counteraction of the other biases and for deenergizing the energized amplifiers in said first row thereby to effect transfer of the data stored in said first row to said next successive row.

9. A data storage register having a plurality of data storage rows arranged in succession and each comprising a plurality of electrically energizable devices each having an input and an output, means for supplying to the initial row in said succession, data to be stored in the form of patterns of energization of said devices in said initial row, an OR unit responsive to the presence of data in a first of said rows for producing a data-present signal, a second OR unit responsive to the presence of data in the next successive row for producing a data-present signal and discriminator means responsive to a data-present signal from said first OR unit and to the absence of a data-present signal from said second OR unit for effecting transfer of data in said first row to said next row and responsive to data-present signals from both said OR units for preventing said transfer, said discriminator means comprising a magnetic amplifier having a turn-on input coil supplied from said first OR unit and a turn-off input coil supplied from said second OR unit.

10. A data storage register having a plurality of data storage rows arranged in succession and each comprising a plurality of magnetic amplifiers each having an output, means providing a predetermined amount of negative bias, turn-off coil and a turn-on input coil, means for supplying to the initial row in said succession data to be stored in the form of patterns of energization of said amplifiers, connections from the outputs of said amplifiers in each preceding row to the turn-on input coils of the corresponding amplifiers in the next successive row for partially counteracting the negative biases of said amplifiers in said next successive row corresponding to the amplifiers energized in said preceding row, and discriminator means responsive to the presence of data in a first of said rows and to the absence of data in the next successive row for supplying to the turn-on coil of all amplifiers in said next successive row equal amounts of energization sufficient to complete the counteraction of the partially counteracted biases but insufficient to complete the counteraction of the non-partially counteracted biases and for supplying to the turn-off coils of the amplifiers of said first row predetermined amounts of energization for counteracting the energizations of their turn-on coils thereby to effect transfer of the data in said first row to said next successive row.

11. A data storage register having a plurality of data storage rows arranged in succession and each comprising a plurality of magnetic amplifiers each having an output, means providing a predetermined amount of negative bias, a turn-off coil and a turn-on input coil, means for supplying to the initial row in said succession data to be stored in the form of patterns of energization of said amplifiers, connections from the outputs of said amplifiers in each preceding row to the turn-on input coils of the corresponding amplifiers in the next successive row for partially counteracting the negative biases of said amplifiers in said next successive row corresponding to the amplifiers energized in said preceding row, and discriminator means responsive to the presence of data in a first of said rows and to the absence of data in the next successive row for supplying to the turn-on coils of all amplifiers in said next successive row equal amounts of energization sufficient to complete the counteraction of the partially counteracted biases but insufficient to complete the counteraction of the non-partially counteracted biases and for supplying to the turn-off coils of the amplifiers of said first row, predetermined amounts of energization for counteracting the energizations of their turn-on coils thereby to effect transfer of the data in said first row to said next successive row, said discriminator means comprising a magnetic amplifier having an output connected to the turn-off coils of the amplifiers of said first row and to the turn-on coils of the amplifiers of said second row, an input turn-on coil supplied from the outputs of said first row amplifiers and a turn-off coil supplied from the outputs of said second row amplifiers.

12. A data storage register having a plurality of data storage rows arranged in succession and each comprising a plurality of self-saturating magnetic amplifiers each having an output, a turn-on input coil and a turn-off coil and means providing a predetermined amount of negative bias, means for supplying energization to said turn-on coils of selected amplifiers in the initial row of said succession to effect storage of data in the form of unique patterns of energization of said amplifiers, connections from the outputs of said amplifiers in a preceding row to the turn-on coils of the corresponding amplifiers in the next successive row for partially counteracting the biases of the amplifiers in said next successive row corresponding to the amplifiers energized in said preceding row, a plurality of cancel buses one for each of said rows and connected to the turn-off coils of the amplifiers therein, a plurality of shift buses, one for each of said rows except the initial row in said succession and connected to the turn-on coils therein, discriminator means responsive to the existence of output voltages of one or more amplifiers in a first of said rows and to the absence of output voltages from the amplifiers of the next successive row for supplying to the shift bus for said next successive row energization sufficient to complete the counteraction of the partially counteracted biases and insufficient to complete the counteraction of the non-partially counteracted biases and for supplying energization to the cancel bus for said first row to deenergize the energized amplifiers therein, said discriminator means comprising a magnetic amplifier having an output connected to the shift bus for said next successive row and to the cancel bus for said first row, an input turn-on coil supplied from the outputs of said first row amplifiers and a turn-off coil supplied from the outputs of said second row amplifiers.

13. A data storage register having a plurality of data storage rows arranged in succession and each comprising a plurality of electrically energizable devices each having an input and an output, means for supplying to the initial row in said succession, data to be stored in the form of patterns of energization of said devices in said initial row, connections from the outputs of said devices in each row to the inputs of corresponding devices in the next successive row for partially energizing said devices in said next successive row corresponding to those energized in the preceding row, discriminator means energized in response to the presence of data in a first of said rows and to the absence of data in the next successive row for supplying to the inputs of all devices in said next successive row equal amounts of energization sufficient to complete the energization of said partially energized devices but insufficient to complete the energization of the non-partially energized devices and for effecting deenergization of said energized devices in said first row, and a time delay device responsive to energization of said discriminator means for delaying the deenergization of said energized devices in said first row for a predetermined interval of time after completion of the energization of said corresponding devices in said second row.

14. A control system comprising a data storage register having a plurality of data storage rows arranged in succession and each comprising a plurality of electrically energizable storage devices each having an input and an output, means for supplying to the initial data storage row in said succession, data to be stored in the form of different distinct patterns of energization of said devices in said initial row, means for transferring said patterns of energization of said storages from each row to the next in succession, a plurality of control devices each operatively associated with a different one of said data storage rows, and a plurality of data readers each associated with a different one of said control devices and with its associated data storage row and each comprising a magnetic amplifier having an output, an input turn-on coil and an input turn-off coil, connections from said turn-on coil to the outputs of selected storage devices in said associated row, and connections from said turn-off coil to the outputs of all other data storage devices in said associated row to effect selective response of said amplifier only predetermined distinct patterns of energization of the devices in said associated row to provide for control of the actuation of said associated control device.

(References on following page)

References Cited in the file of this patent

UNITED STATES PATENTS

| | | |
|---|---|---|
| 2,066,702 | Snyder | Jan. 5, 1937 |
| 2,194,352 | Brixner | Mar. 19, 1940 |
| 2,539,998 | Holland-Martin et al. | Jan. 30, 1951 |
| 2,651,412 | Aller | Sept. 8, 1953 |
| 2,700,502 | Hamilton et al. | Jan. 25, 1955 |
| 2,700,728 | Brixner et al. | Jan. 25, 1955 |
| 2,753,545 | Lund | July 3, 1956 |
| 2,778,006 | Guterman | Jan. 15, 1957 |
| 2,788,896 | Coleman | Apr. 16, 1957 |
| 2,900,497 | Van Sande | Aug. 18, 1959 |

OTHER REFERENCES

Publication: Electrical Engineering, September 1953, pp. 791–795.